(12) United States Patent
Foust

(10) Patent No.: US 7,031,837 B1
(45) Date of Patent: Apr. 18, 2006

(54) PROACTIVE COLLISION AVOIDANCE SYSTEM

(76) Inventor: Steve Foust, 635 North Sr., Croix Trail, Oak Park Heights, MN (US) 55082

( * ) Notice: Subject to any disclaimer, the term of this patent is extended or adjusted under 35 U.S.C. 154(b) by 105 days.

(21) Appl. No.: 10/633,398

(22) Filed: Aug. 1, 2003

Related U.S. Application Data

(60) Provisional application No. 60/400,308, filed on Aug. 1, 2002.

(51) Int. Cl.
G06F 17/10 (2006.01)
G06G 7/78 (2006.01)

(52) U.S. Cl. ..................... 701/301; 701/312

(58) Field of Classification Search ............... 700/39, 700/49, 96, 245, 247–250, 258–259; 318/568.11, 318/568.12; 701/23, 28, 47, 200, 207, 213, 701/217, 220, 301; 342/89; 375/130, 376; 901/47; 340/903, 435–436, 902, 904; 180/167, 180/169, 171; 367/909
See application file for complete search history.

(56) References Cited

U.S. PATENT DOCUMENTS

| | | | |
|---|---|---|---|
| 4,003,049 A | 1/1977 | Sterzer | |
| 4,724,312 A | 2/1988 | Snaper | |
| 5,153,836 A * | 10/1992 | Fraughton et al. | 701/301 |
| 5,949,371 A * | 9/1999 | Nichols | 342/357.01 |
| 6,198,528 B1 * | 3/2001 | Maynard | 356/141.1 |
| 6,259,403 B1 * | 7/2001 | Nichols | 342/357.14 |
| 6,393,362 B1 * | 5/2002 | Burns | 701/301 |
| 6,405,132 B1 * | 6/2002 | Breed et al. | 701/301 |
| 6,408,226 B1 * | 6/2002 | Byrne et al. | 700/258 |
| 6,429,812 B1 * | 8/2002 | Hoffberg | 342/357.1 |
| 6,526,352 B1 * | 2/2003 | Breed et al. | 701/213 |
| 6,677,938 B1 * | 1/2004 | Maynard | 345/419 |
| 6,687,571 B1 * | 2/2004 | Byrne et al. | 700/245 |
| 6,693,973 B1 * | 2/2004 | Ionescu | 375/295 |
| 6,763,282 B1 * | 7/2004 | Glenn et al. | 700/245 |
| 6,768,944 B1 * | 7/2004 | Breed et al. | 701/301 |
| 6,831,572 B1 * | 12/2004 | Strumolo et al. | 340/903 |
| 2002/0198632 A1 * | 12/2002 | Breed et al. | 701/1 |
| 2003/0072386 A1 * | 4/2003 | Ionescu | 375/295 |
| 2003/0191568 A1 * | 10/2003 | Breed | 701/36 |
| 2003/0203717 A1 * | 10/2003 | Chuprun et al. | 455/12.1 |

OTHER PUBLICATIONS

Takahashi et al., Going out experience robot for bedridden people by remote control system, 2000, IEEE, pp. 175-178□□.*
Singh et al., Design and development of voice/tele operated intelligent mobile robot, 1997, IEEE, pp. 177-180□□.*

* cited by examiner

*Primary Examiner*—Yonel Beaulieu
*Assistant Examiner*—McDieunel Marc
(74) *Attorney, Agent, or Firm*—Sherrill Law Offices, PLLC; Elizabeth D. Lewen

(57) ABSTRACT

The invention is a proactive collision avoidance system. The system comprises a first paired set of a transmitter effective for transmitting a radio signal and a receiver effective for receiving a radio signal from a limited distance, a means for preventing the receiver in the first paired set from receiving the radio signal transmitted by the transmitter in the first paired set while permitting the receiver in the first paired set to receive a radio signal transmitted by a transmitter in a second paired set, and a means in electrical communication with the receiver in the first paired set for generating a perceptible signal upon receipt of the radio signal from the second paired set.

11 Claims, 1 Drawing Sheet

PROACTIVE COLLISION AVOIDANCE SYSTEM

This application claims priority to U.S. Provisional patent application Ser. No. 60/400,308, filed Aug. 1, 2002.

FIELD OF INVENTION

The invention relates to a proactive collision avoidance system and a method for the system's use.

BACKGROUND

Recreational vehicles such as all-terrain vehicles (ATVs), snowmobiles, personal watercrafts, and boats have historically been associated with a high degree of inherent danger. Such recreational vehicles are typically manned by inexperienced youths. Daytime usage, whereby illumination of oncoming or passing traffic is low or limited, is not uncommon. Detection of oncoming or passing traffic is problematic, particularly on hilly or winding terrain. Rural areas are becoming more congested and the number of collisions has increased. Some of these collisions can be traced to driver inattentiveness or the failure of the driver to visualize another oncoming or passing vehicle. Additionally there is a high mortality rate involving these collisions, due to high-speed impact, and lack of driver protection gear. There is a dire need for a system and method of warning recreational vehicle drivers of oncoming or passing traffic before the problem results in a collision and potential loss of life.

Accordingly, a need exists for a system and method of warning recreational vehicle drivers of oncoming or passing traffic with a low incidence of false warnings.

SUMMARY OF THE INVENTION

The first embodiment of the invention is a proactive collision avoidance system. The system comprises a first paired set of a transmitter effective for transmitting a radio signal and a receiver effective for receiving a radio signal from a limited distance, a means for preventing the receiver in the first paired set from receiving the radio signal transmitted by the transmitter in the first paired set while permitting the receiver in the first paired set to receive a radio signal transmitted by a transmitter in a second paired set, and a means in electrical communication with the receiver in the first paired set for generating a perceptible signal upon receipt of the radio signal from the second paired set.

A second embodiment of the invention involves activating a first proactive collision avoidance system, mounted on a first recreational vehicle. The system comprising a first paired set of a transmitter effective for transmitting a radio signal and a receiver effective for receiving a radio signal from a limited distance, a means for preventing the receiver in the first paired set from receiving the radio signal transmitted by the transmitter in the first paired set while permitting the receiver in the first paired set to receive a radio signal transmitted by a transmitter in a second paired set, and a means in electrical communication with the receiver in the first paired set for generating a perceptible signal upon receipt of the radio signal from the second paired set. The system transmits the radio signal from the transmitter of the first paired set and receives the radio signal from the transmitter of the second paired set installed on a second recreational vehicle, by the receiver of the first paired set, wherein the perceptible signal is generated by the first paired set so as to provide a warning that the second recreational vehicle is within the limited distance of the first recreational vehicle.

DETAILED DESCRIPTION OF THE INVENTION INCLUDING A BEST MODE

Definitions

Figure 1:
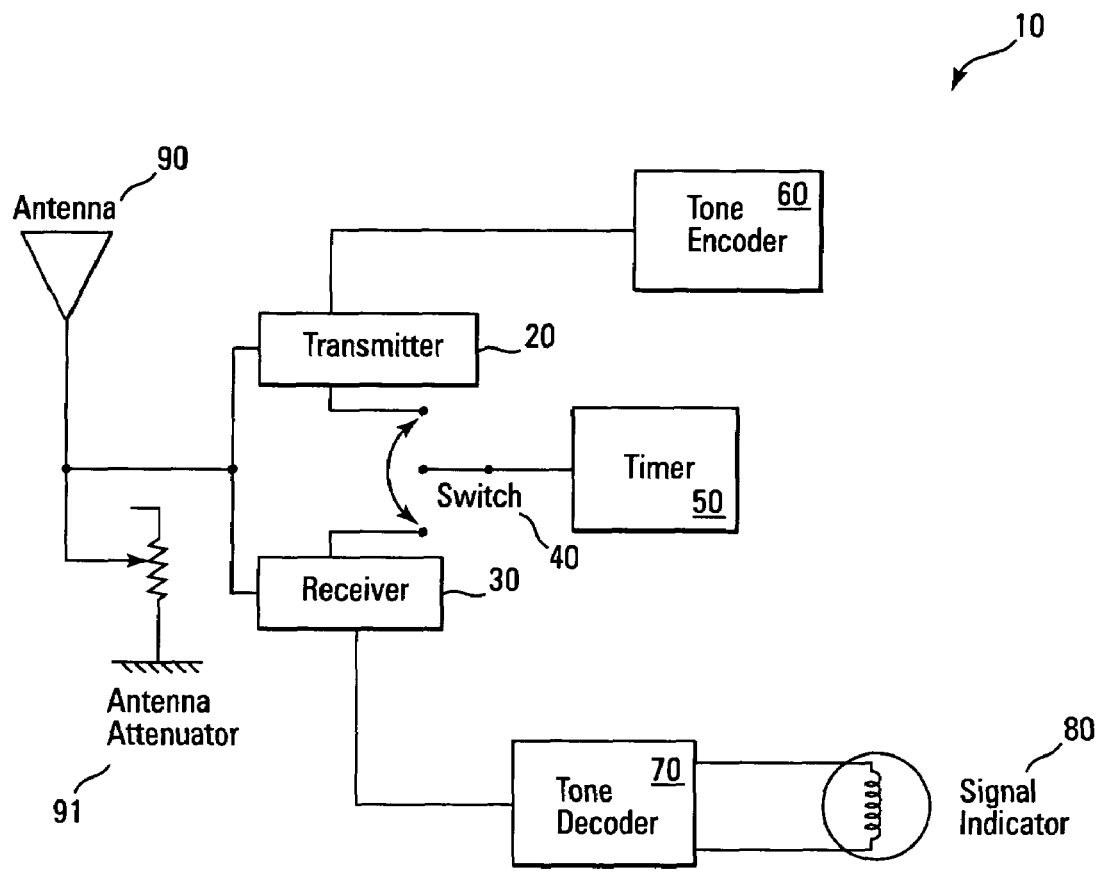
FIG. 1 is a block diagram of one embodiment of the invention.

As utilized herein, the phrase "limited distance" means a distance of no more than 300 feet.

As utilized herein, the phrase "perceptible signal" means any and all means of communication capable of conveying notice or warning to a person, including specifically, but not exclusively audible signals (e.g., buzz), tactile signals (e.g., vibration), visual signals (e.g., flashing light), and multimedia signals (e.g., buzz and flashing light).

As utilized herein, the term "beacon" refers to transmitting and/or receiving signals.

As utilized herein, the phrase "recreational vehicle" means a vehicle powered by a combustible engine or electricity and designed for off-road use, including specifically, but not exclusively, all-terrain vehicles, snowmobiles, personal watercraft, boats, off-road motorcycles, dune buggies.

Nomenclature
10 System
20 Transmitter
30 Receiver
40 Switch
50 Timer
60 Tone Encoder
70 Tone Decoder
80 Signal Indicator
90 Antenna
91 Antenna Attenuator Composition The present invention is a timed collision avoidance system 10 utilizing a first paired set of its own transmitter 20 and receiver 30. The transmitter 20 should be effective for transmitting a radio signal (not shown). The transmitter 20 may also include a tone encoder 60 to facilitate transmission of the radio signal. Tone encoders 60 are known in the field. The receiver 30 should be effective for transmitting a radio signal. Preferably the transmitter 20 and receiver 30 are set to transmit and receive a radio signal at the same given frequency. The preferred frequency is 5,000 hertz. The transmitter 20 and receiver 30 can also be set to only transmit and receive for a limited distance thereby providing a range for the system 10. By setting the transmitter 20 and receiver 30 for a limited distance it reduces the chance of receiving a radio signal from another system 10 that is too far away to be of concern to a user (not shown) of the receiving system 10. The range can vary by type of unit, placement of device, battery condition, terrain, and weather conditions. The preferred range is a limited distance of no more than 300 feet. The range can be preset at the time of manufacture of the system 10 or made adjustable by the user.

A tone coded squelch (not shown) may also be used on the system 10 to prevent false signaling. Use of tone coded squelches with transmitters 20 and receivers 30 is known in the field.

An individual transmitter 20 and receiver 30 may be used, but the preferred method is to utilize a transceiver (not shown) having a "beep knowledge" or end of transmission signal that can be decoded by another vehicle utilizing the proactive collision avoidance system 10. Any known transceiver utilizing the "beep knowledge" may be used in the system 10.

The system 10 may also include a means for preventing the receiver 30 from receiving the radio signal transmitted from its paired transmitter 20 while permitting the receiver 30 to receive a radio signal transmitted by a transmitter 20 in another system 10. This element of the system 10 precludes the system 10 from reporting false warnings to the user. The preferred means is a switch 40 allowing the electrical current to only be in communication with either the transmitter 20 or the receiver 30 at any given time. Such switches 40 are known in the field. The switch 40 may also be in communication with a timer 50 that automatically activates the switch 40 to cycle the system 10 between transmitting and receiving. Preferably, the timer 50 maintains a cycle of 0.5 to 2 seconds between transmitted radio signals. The cycle time may be user adjustable or may be preset by the manufacturer.

The system 10 may further include a means in electrical communication with the receiver 30 for generating a perceptible signal upon receipt of the radio signal of a second system 10. The preferred means is a tone decoder 70 and a perceptible signal displayed by a perceptible signal indicator 80. The preferred perceptible signal indicator 80 is an LED perceptible signal indicator 80. Both tone decoders 70 and LED perceptible signal indicators 80 are known in the field. The perceptible signal indicator 80 may remain active for a set period of time upon the receipt of a radio signal. The period of time can be permanently set at manufacture or made user adjustable. Preferably the perceptible signal indicator 80 will remain active for 20 seconds after the last receipt of a radio signal.

The system 10 may also include an antenna 90 with an antenna attenuator 91 to facilitate sending and receiving the radio signals to and from the desired distance.

The electronic parts used in the preferred embodiment include a 75 MHz receiver 30, a 75 MHz transmitter 20, a timer 50 to switch between transmit and receive, a 5,000 Hz decoder 70, a 5,000 Hz encoder 60, and a SuperBrite LED signal indicator 80.

Use

The system 10 may be used with a recreational vehicle (not shown). The system 10 may be mounted on a first recreational vehicle. The system 10 is then activated to transmit a radio signal from the transmitter 20. The switch 40 is then activated to allow the receiver 30 to receive a radio signal from a second system 10 mounted on a second recreational vehicle. Upon receipt of a radio signal from the second system 10 within the limited distance the first system 10 generates a perceptible signal and activates the perceptible signal indicator 80 warning the user of the first system 10 that the second recreational vehicle is within the limited distance of the first recreational vehicle. The system 10 may work with an infinite number of other systems 10 as long as all systems 10 are set to transmit and receive at the same frequency.

Systems 10 must operate on the same frequency channel for the systems 10 to communicate with each other. The system 10 relies on timing cycles on individual systems 10 not being coordinated. This ensures that synchronization (two systems 10 operating at the same time) will be rare and unlikely to cause missed beacons when the transmitter 20 is transmitting).

The preferred recreational vehicle is a snowmobile. An example of the system 10 in use on a snowmobile is as follows. Snowmobile #1 is equipped with a proactive collision avoidance system 10. Every 2–15 seconds a short radio signal is transmitted announcing its presence to any other units within range. Preferably, this transmission will be verified by an LED indicator 80 on the front panel (not shown) of the snowmobile. At the conclusion of this transmission, the system 10 can monitor the frequency channel for transmitted radio signal from similarly equipped systems 10.

Snowmobile #2 is equipped with a proactive collision avoidance system 10. If within range, the radio signal can be received and indicate its proper reception by illuminating an LED indicator 80 on the front panel of the snowmobile. Once the warning signal is received, the illuminated warning light can then extinguish. The "In-Range" LED 80 can remain lit for a period of time, to warn the driver of proximity detection. The "In-Range" LED 80 timing can allow an extended warning period. Preferably the "In-Range" LED 80 remains lit for 20 seconds. The system 10 can also beacon every 2–15 seconds alerting other systems 10 of its presence.

Other recreational vehicles equipped with a proactive collision avoidance system 10 can operate in the same way, with no limit on the number of equipped units.

In the technical operation of the preferred embodiment the system 10 alternates between transmitting a 5,000 Hz radio signal that has been encoded by a tone encoder 60 and searching for a 5,000 Hz radio signal from another system 10. When a 5,000 Hz radio signal is detected by the tone decoder 70 a perceptible signal indicator 80, such as a SuperBrite LED signal indicator 80, is illuminated. The LED signal indicator 80 illumination is for a set time period of approximately 20 seconds so that the user can view the LED signal indicator 80 illumination. After the timing period has expired, without another 5,000 Hz signal being received, the LED signal indicator 80 illumination extinguishes.

I claim:

1. A proactive collision avoidance system, comprising:
   (a) a first paired set of a transmitter and a receiver, wherein:
      (1) the transmitter is effective for transmitting a radio signal, and
      (2) the receiver is effective for receiving a radio signal from a limited distance;
   (b) a means for preventing the receiver in the first paired set from receiving the radio signal transmitted by the transmitter in the first paired set while permitting the receiver in the first paired set to receive a radio signal transmitted by a transmitter in a second paired set wherein the means is a switch having a timer set to alternate between the transmitter and the receiver of the first paired set; and
   (c) a means in electrical communication with the receiver in the first paired set for generating a perceptible signal upon receipt of the radio signal from the second paired set.

2. The proactive collision avoidance system recited in claim 1 wherein the timer is set to alternate between the transmitter and the receiver of the first paired set every 0.5 to 2 seconds.

3. The proactive collision avoidance system recited in claim 1 wherein the means in electrical communication with the receiver in the first paired set for generating a perceptible signal upon receipt of the radio signal from the second paired set is a tone decoder and an LED display.

4. A proactive collision avoidance system, comprising:
   (a) a first paired set of a transmitter and a receiver mounted onto a recreational vehicle, wherein
      (1) the transmitter is effective for transmitting a radio signal, and
      (2) the receiver is effective for receiving a radio signal from a limited distance,
   (b) a means for preventing the receiver in the first paired set from receiving the radio signal transmitted by the transmitter in the first paired set while permitting the receiver in the first paired set to receive a radio signal transmitted by a transmitter in a second paired set wherein the means is a switch having a timer set to alternate between the transmitter and the receiver of the first naked set, and
   (c) a means in electrical communication with the receiver for generating a perceptible signal upon receipt of the radio signal from the second paired set.

5. The proactive collision avoidance system recited in claim 4, wherein the recreational vehicle is a snowmobile.

6. The proactive collision avoidance system recited in claim 4 wherein the timer is set to alternate between the transmitter and the receiver of the first paired set every 0.5 to 2 seconds.

7. The proactive collision avoidance system recited in claim 4 wherein the means in electrical communication with the receiver in the first paired set for generating a perceptible signal upon receipt of the radio signal from the second paired set is a tone decoder and a LED indicator.

8. A method, comprising:
   (a) activating a first proactive collision avoidance system, mounted on a first recreational vehicle, comprising,
      (1) a first paired set of a transmitter and a receiver, wherein:
         (i) the transmitter is effective for transmitting a radio signal, and
         (ii) the receiver is effective for receiving a radio signal from a limited distance,
      (2) a means for preventing the receiver in the first paired set from receiving the radio signal transmitted by the transmitter in the first paired set while permitting the receiver in the first paired set to receive a radio signal transmitted by a transmitter in a second paired set wherein the means is a switch having a timer set to alternate between the transmitter and the receiver of the first paired set, and
      (3) a means in electrical communication with the receiver in the first paired set for generating a perceptible signal upon receipt of the radio signal from the second paired set;
   (b) transmitting the radio signal from the transmitter of the first paired set; and
   (c) receiving the radio signal from the transmitter of the second paired set installed on a second recreational vehicle, by the receiver of the first paired set wherein the perceptible signal is generated by the first paired set so as to provide a warning that the second recreational vehicle is within the limited distance of the first recreational vehicle.

9. The method recited in claim 8, wherein the first recreational vehicle is a snowmobile and the second recreational vehicle is a snowmobile.

10. The method recited in claim 8 wherein the timer is set to alternate between the transmitter and the receiver of the first paired set every 0.5 to 2 seconds.

11. The method recited in claim 8 wherein the means in electrical communication with the receiver in the first paired set for generating a perceptible signal upon receipt of the radio signal from the second paired set is a tone decoder and an LED indicator.

* * * * *

UNITED STATES PATENT AND TRADEMARK OFFICE
CERTIFICATE OF CORRECTION

| | | |
|---|---|---|
| PATENT NO. | : 7,031,837 B1 | Page 1 of 1 |
| APPLICATION NO. | : 10/633398 | |
| DATED | : April 18, 2006 | |
| INVENTOR(S) | : Foust | |

It is certified that error appears in the above-identified patent and that said Letters Patent is hereby corrected as shown below:

On the title page (76)
Inventor Address Error: "Sr.," should be --St.--
Colimn 5 Line 20: "Naked" should be --paired--
Column 6 Line 22: Should be --,-- after word "set"

Signed and Sealed this

Nineteenth Day of September, 2006

JON W. DUDAS
*Director of the United States Patent and Trademark Office*